United States Patent [19]

Yeager

[11] Patent Number: 5,711,378
[45] Date of Patent: Jan. 27, 1998

[54] KNOCK-ON EARTH WORKING TOOL SECUREMENT ASSEMBLY

[75] Inventor: Linus I. Yeager, St. Brieux, Canada

[73] Assignee: F. P. Bourgault Tillage Tools, Ltd., St. Brieux, Canada

[21] Appl. No.: 633,482

[22] Filed: Apr. 17, 1996

[51] Int. Cl.⁶ .................................................. A01B 15/00
[52] U.S. Cl. .......................... 172/730; 172/749; 172/762
[58] Field of Search ................................. 172/762, 752, 172/750, 749, 730, 681

[56] References Cited

U.S. PATENT DOCUMENTS

| | | | |
|---|---|---|---|
| 2,876,853 | 3/1959 | Christofferson | 172/753 |
| 3,061,021 | 10/1962 | Shader | 172/750 |
| 3,175,314 | 3/1965 | Williamson | 172/762 X |
| 3,357,117 | 12/1967 | Petersen | 172/762 X |
| 3,773,114 | 11/1973 | Griffin | 172/762 |
| 4,190,115 | 2/1980 | Couture | 172/762 X |
| 4,195,697 | 4/1980 | Griffin | 172/730 |
| 4,576,239 | 3/1986 | Launder | 172/762 X |
| 4,638,868 | 1/1987 | Johnson et al. | 172/762 |
| 4,867,248 | 9/1989 | Robertson et al. | 172/753 |
| 4,871,032 | 10/1989 | McGuire et al. | 172/749 |
| 5,465,796 | 11/1995 | Buescher et al. | 172/762 |

FOREIGN PATENT DOCUMENTS

| | | | |
|---|---|---|---|
| 22790 | 4/1936 | Australia | 172/762 |
| 92883 | 5/1905 | Canada | |
| 987529 | 4/1976 | Canada | |
| 2016414 | 10/1991 | Canada | |

*Primary Examiner*—Terry Lee Melius
*Assistant Examiner*—Christopher J. Novosad
*Attorney, Agent, or Firm*—Watson Cole Stevens Davis, PLLC

[57] ABSTRACT

A tapered adaptor (10) disposed at a free, leading end of a cultivator shank (S) is arranged to co-operate with a blocking member (27). The blocking member (27) defines forwardly facing abutment surfaces (28, 29). They engage a rear edge portion (54) of the socket (46) of a sweep when the sweep is subjected to a hard impact which would otherwise force the socket beyond the position required for a firm wedging frictional grip with the adaptor (10). Thus, the undesired displacement excessively beyond the required grip position is prevented to enable removal of the socket (46) on exchange of the sweep by a hammer blow. A retainer pin (32) is resiliently held in a transverse groove (31) by the nose (35, 36) of a pair of flat springs. Thus the free movement which might result in loss of the pin 32 is prevented while allowing relatively easy withdrawal of the pin when the sweep is to be knocked off the adaptor. Several alternative embodiments are mentioned. The preferred taper of the adaptor (10) and thus of the sleeve (46) amounts to an included angle of about 2°.

18 Claims, 5 Drawing Sheets

KNOCK-ON EARTH WORKING TOOL SECUREMENT ASSEMBLY

BACKGROUND OF THE INVENTION

The present invention relates to an assembly for an earth working implement and is particularly, but not exclusively, concerned with tapered adaptors used in securement of earth working tools to a farming machinery. The invention is particularly directed to an improvement in securing cultivator sweeps to a cultivator.

Cultivator sweeps are typically of an integral structure comprised of a V-shaped blade or wing section and a socket projecting obliquely upwardly and rearwards from the wing section and having an open longitudinal underside. In modern sweeps, the socket is complementary in its taper with an adaptor tapering in the direction toward the sweep blade section. An adaptor is either bolt fastened to a shank of the farming machine such as a cultivator, or the shank of the farming machine itself is shaped at a free end thereof into a tapered adaptor complementary with the socket of the particular sweep. The tapered adaptor combines with the socket of the sweep to provide a "knock-on" securement, i.e. a firm wedging frictional grip between the two by mere a hammer blow at the tip of the sweep. Its main purpose is to allow an easy removal by a hammer blow at the rear edge of the socket. The grip virtually eliminates the need for bolt fastening of the socket to the shank.

An arrangement having a tapered adaptor bolted to the free end of a shank is described, for example, in Australian patent 106,027 (Marlow). The embodiment of an adaptor integral with free leading end of a shank is described in U.S. Pat. No. 5,465,796 (Buescher et al.). The disclosures of both of the above references are incorporated herein by reference.

The present invention is primarily directed to the bolted-on adaptors. However there are aspects of the invention which can also be applied and used with the alternative adaptor system mentioned.

In the operation of cultivators, it often happens that one of the tools hits a rock or the like obstacle within the ground. This subjects the particular sweep to an extremely heavy impact increasing the frictional grip well beyond the required "knock-on" grip to a point where it is virtually impossible to later release the sweep by a mere hammer blow at the rear edge of the socket. The quick and easy removal of the tool is no longer possible as special heavier tools may be required or even complex cutting procedures to remove the worn sweep.

Cultivator sweeps must be safely secured to the respective adaptor and prevented from inadvertent falling off the tine if, for some reason, the frictional wedging grip is lost. To this end various safety back-up solutions have been proposed but they all require a relatively complex way of removal of a retainer pin or a screw.

It is an object of the present invention to advance the art of the "knock-on" securement of cultivator sweeps or the like earth working devices by eliminating or at least reducing the problems outlined above.

SUMMARY OF THE INVENTION

In general terms, the invention provides an assembly for securement of an earth working tool to an elongated, tapered adaptor complementary with a tapered socket of the tool in order to secure the tool to an earth working implement by a wedging frictional grip. The assembly comprises an elongated tapered prism including: i) a first end and an opposed second end; ii) securement means for fixedly securing the prism to an associated earth working implement; iii) opposed side surfaces complementary with inner surfaces of the socket of an associated earth working tool for a wedging frictional grip between the prism and the socket upon a forced insertion of the socket over and along the prism, in a direction from said first end to said second end of the prism shaped adaptor. According to one feature of the invention, the assembly further comprises blocking means adapted to block excessive additional relative movement between the socket and the prism beyond a location providing a firm wedging frictional grip between the socket and the prism.

It is preferred that the blocking means be adapted to engage a rear edge portion of the associated socket at a point near the second end of the prism.

In a particularly preferred embodiment, the prism is a bolt-on adaptor and the blocking member forms an abutment part integral with the adaptor, the adaptor itself being arranged for being bolted to the tine or shank of a cultivator or the like.

The integral stop is preferably so arranged that it provides abutment stop surfaces at both sides of the prism and near the rear end thereof while leaving the central top of the stop member flush with the rest of the body of the prism. When the stem or socket of the earth working tool is in place, a central portion of its rear edge is exposed above the adaptor and the stop so that it can be subjected to a hammer blow when it is desired to remove the tool from the shank.

The abutment face is located such that it is somewhat spaced from the rearmost edge of the socket or stem of the earth working tool when the socket is in a firm wedging grip with the adaptor. The abutment surface engages the rear edge of the socket only when extreme conditions such as mentioned above are encountered. In other words, care is exercised to make sure that the abutment face does not impede the relative movement between the adaptor and the socket before a firm wedging frictional grip between the two is established.

Since the means blocking the movement of the socket relative to the adaptor are independent on and additional to the wedging force developing means, the invention allows the use of a further unique structural feature, namely a substantially smaller wedging angle at the adaptor and at the socket of the sweep or other earth working tool. Accordingly, it is a yet another feature of the invention that the included angle of the taper of the adaptor and of the compatible portions of the socket of the earth working tool is from about 2° to about 3°. Consequently, the desired firm wedging grip can be established by a relatively low impact force by a hammer blow at the tip of the tool. Any subsequent high force impact can only displace the socket along the adaptor for a relatively short distance in the range of about ¼ before the rear edge of the socket abuts against the blocking means. Due to the extremely small angle of the taper, such displacement does not excessively increase the wedging force acting at the socket. The tool is firmly held in place yet it is easy to replace as a mere hammer blow at the rear edge of the socket is still sufficient to release the socket from the adaptor even after the heavy impact.

This is a significant improvement over prior art where a compromise angle of 6° or more is used not only for the purpose of providing the wedging friction grip but also to prevent the displacement of the socket on an excessive impact at the sweep. The second function is achieved at the expense of a reduced resistance of the known systems to inadvertent loss of the wedging grip. As is well known, the larger the included angle of any wedging system the more likely the system is to inadvertently lose the grip.

Another advantageous and preferred feature of the present invention is in that the arrangement may include securement pin or the like arrangement which prevents inadvertent sliding of the socket off the adaptor in case of unexpected and undesired loss of the wedging grip due, for instance, to a side impact or a forwardly directed impact on manoeuvring of the cultivator in the field. A transverse groove is provided in the prism. It is disposed between said first and second ends. A somewhat wider corresponding transverse recess portion is provided in the socket. The recess portion is complementary with the groove for alignment therewith when the earth working tool is secured to the adaptor under the wedging frictional grip. A pin is provided which is freely slidable in said groove and is of a smaller cross section than that of said recess portion. It is adapted to engage a rear shoulder of the recess to block undesired sliding of the socket off the adaptor when the wedging frictional grip is lost. Resilient friction inducement means projects into said groove engaging the pin inserted in said groove to increase frictional hold between the groove and the pin in order to prevent free slipping of the pin out of the cutout while allowing, on exchange of the sweeps or the like, a convenient removal of the pin.

The resilient friction inducement means is preferably a pair of L-shaped springs secured to a bolt-on adaptor within a recess in the top of the adaptor, normally used to accommodate the heads of bolts securing the adaptor to the shank of a cultivator or the like.

BRIEF DESCRIPTION OF THE DRAWINGS

The invention will now be described in greater detail by way of a preferred embodiment, with reference to the enclosed simplified, diagrammatic, not-to-scale drawings, it being understood that many modifications of the embodiment described can be made without departing from the scope of the present invention.

In the drawings.

DETAILED DESCRIPTION

Figure 8:
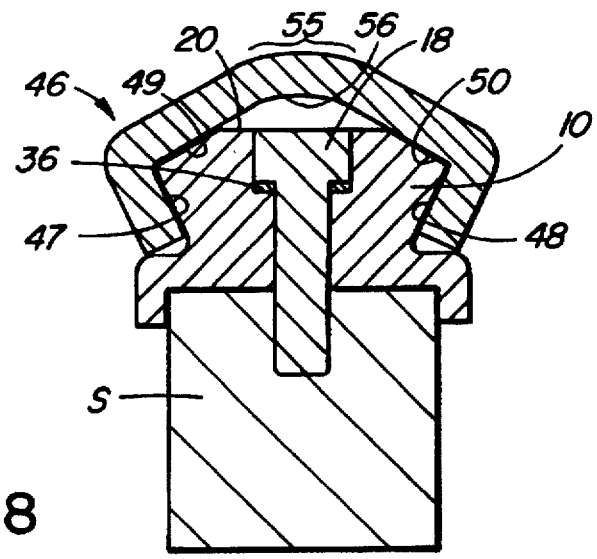
FIG. 8 is section VIII—VIII of FIG. 2 but showing the sweep socket and the adaptor in the operative wedging grip between the two.

Turning now to the representation shown, the adaptor 10 is provided with a flat underside 11 and a pair of side flanges 12, 13. The underside 11 and the side flanges 12 and 13 present, in the embodiment shown, a continuous inverse channel in the lower surface of the adaptor. The distance between the inner surfaces of the flanges 12 and 13 is, of course, dictated by the particular configuration of the shank S (FIGS. 8–10) to which the adaptor 10 is designed to be bolted. To this end, the top surface of the adaptor 10 is provided with an oval cutout 14 having a flat bottom 15 in which two mounting holes 16, 17 are provided, one at each end of the cutout 14. The cutout 14, of course, is of a size sufficient to accommodate the heads of bolts 18, 19 used in securement of the adaptor 10 to the shank. The top face 20 of the adaptor is generally planar and parallel with the plane of the bottom 11 of the channel underneath.

Figure 3:
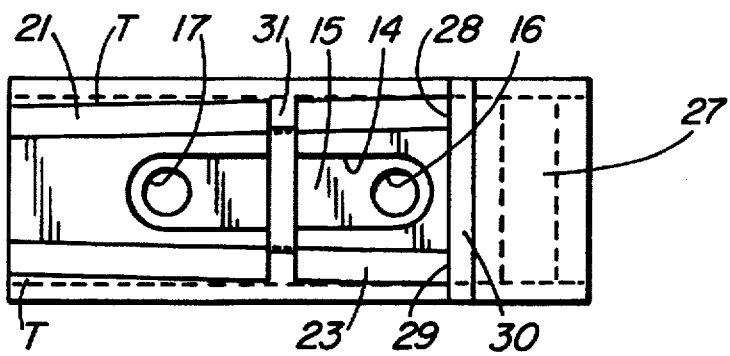
FIG. 3 Is a top plan view of the adaptor of FIG. 1.

There are two side surfaces or walls 21–22, 23–24 on each side of the adaptor 10 so that the adaptor presents the general configuration of a forwards tapering prism. As best seen from FIG. 3, the surfaces 21,22 and 23–24 and the rounded side edges or corners 25, 26 where the respective surfaces adjoin each other, taper in the direction from the rear end R to the front end F (FIG. 1) thereof. In the preferred embodiment shown, the taper T is from about 1° to about 1° 30' which corresponds to an included angle of from about 2° to about 3°.

Figure 4:
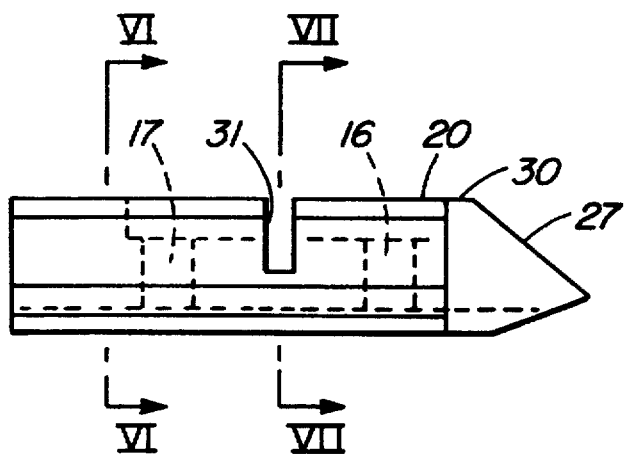
FIG. 4 is a side view thereof.
Figure 5:
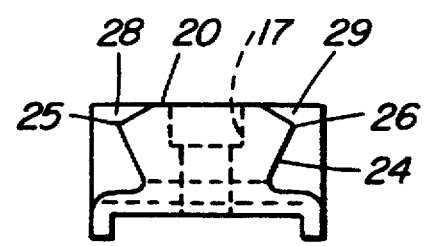
FIG. 5 is a simplified front end view thereof.
Figure 6:
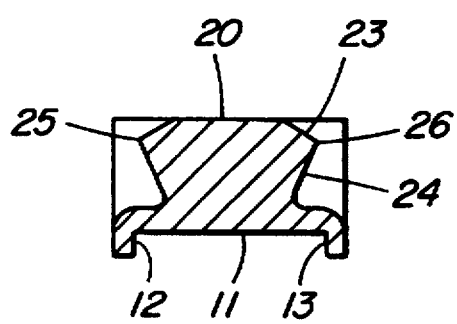
FIG. 6 is section VI—VI of FIG. 4.
Figure 7:
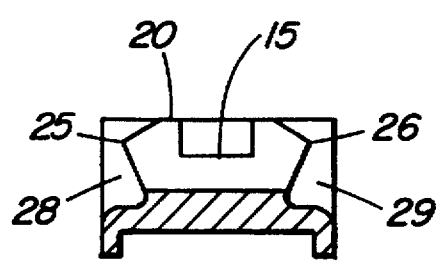
FIG. 7 is section VII—VII of FIG. 4.

The assembly of the invention includes blocking means, in the preferred embodiment, a blocking member 27 of a generally triangular configuration in side view (FIG. 4). The member 27 is integral with the adaptor 10 at the rear end R thereof. While the shape shown in the drawings is preferred, it will be appreciated that the actual configuration of the blocking member is optional and that, in certain embodiments, the blocking member may be separate from the adaptor and could be fixedly secured to or made integral with the respective tine or shank. Nevertheless, the preferred embodiment of the adaptor 10 does have an integral rear member 27. The main part of the rear member 27 is what is generally referred to as an "abutment surface". Two blocking or abutment surfaces 28, 29 are shown which are generally coplanar and are disposed one to each side of the adaptor. The abutment faces 28, 29 are included for the purpose of blocking excessive relative movement between the socket of the earth working tool and the prism 10 as will be described.

It is noteworthy that the blocking member 27 has a top face 30 which is flush with the top surface 20 of the adaptor. The reason for the absence of an abutment face on top of the blocking member 27 will be described later.

Figure 1:
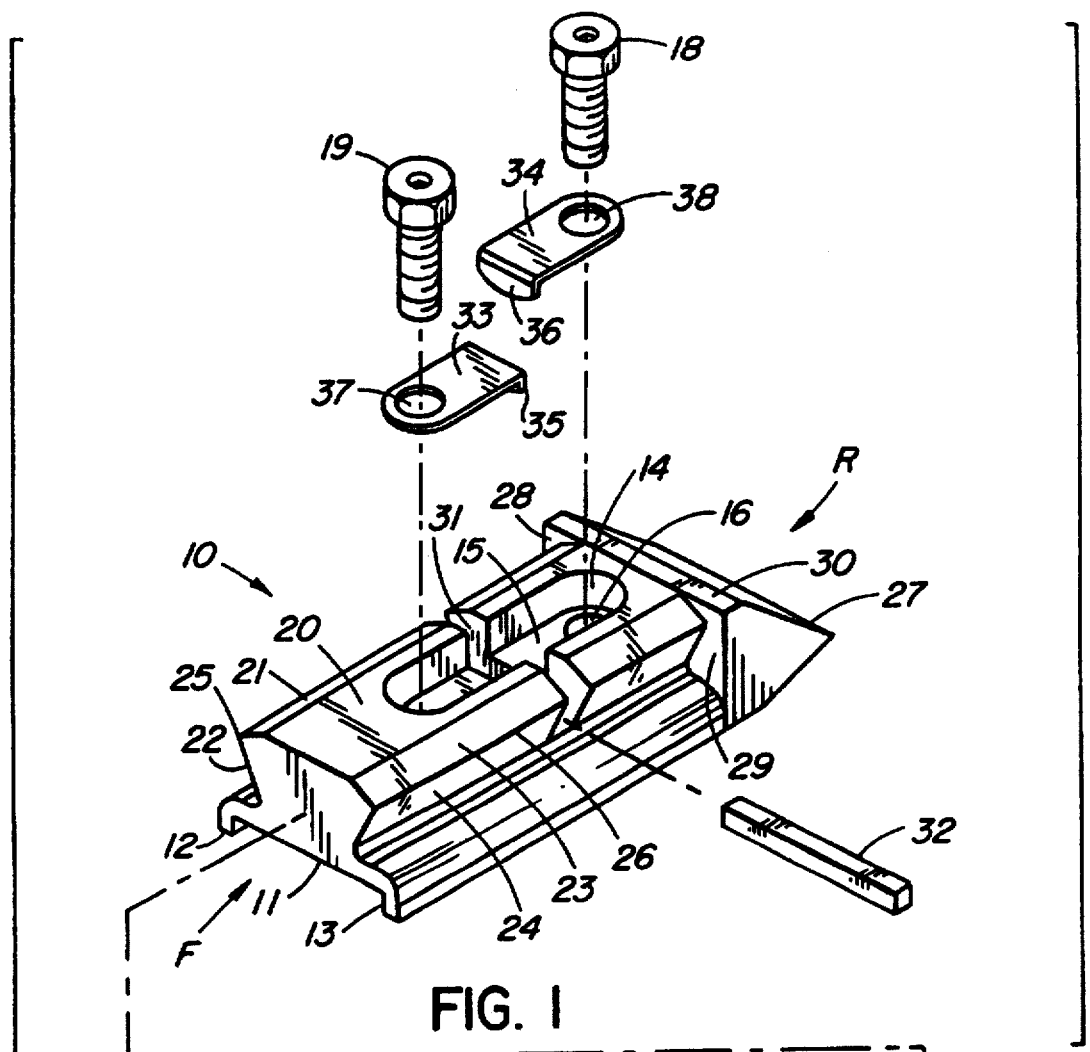
FIG. 1 is an exploded perspective view of one embodiment of the adaptor and some of the parts associated with it, incorporating features of the present invention.
Figure 9:
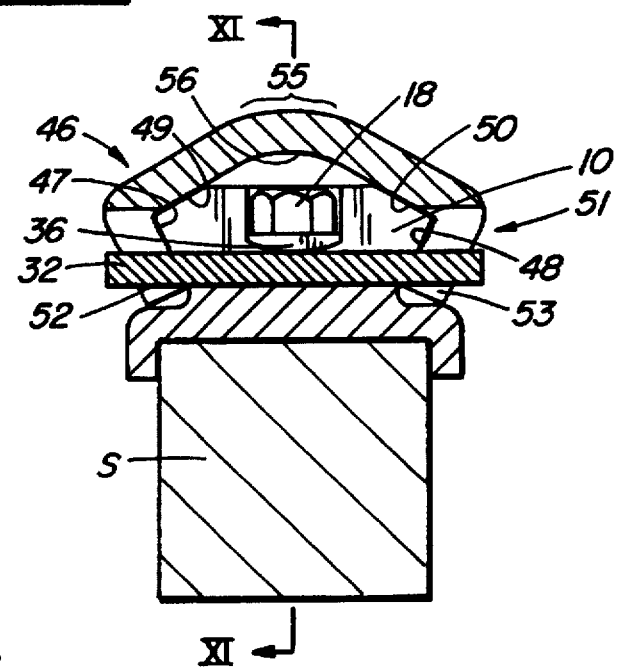
FIG. 9 is section IX—IX of FIG. 2 but showing the socket and also the retainer pin in an operative arrangement.
Figure 10:
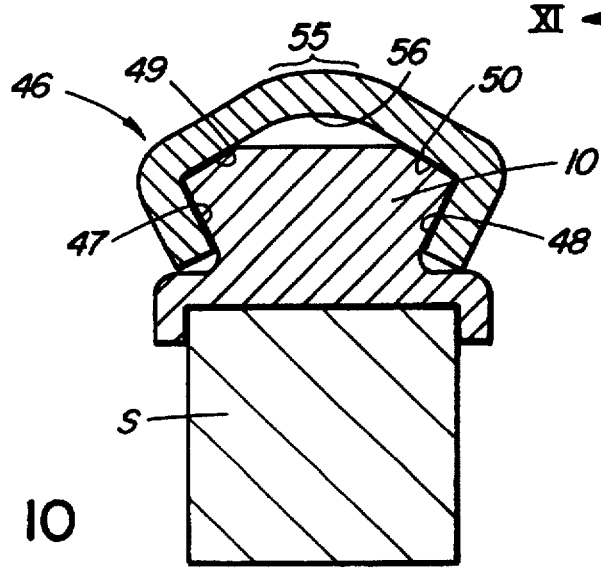
FIG. 10 is section X—X of FIG. 2 but showing the socket and the adaptor in the firm wedging frictional grip.

Machined in the body of the adaptor 10 is an upwardly open transverse passage or groove 31 which is located between the first and second end of the adaptor 10. As best seen from FIGS. 1 and 4, the groove 31 is open at both sides of the prism. It is slidingly compatible with a pin 32 (FIG. 1). Thus, the pin 32 can be freely inserted into the groove 31 to make both ends of the pin 32 project beyond the side surfaces 22 and 24. The free sliding movement of the pin along the groove 31 is resiliently retarded by two flat springs 33, 34. Each flat spring 33, 34 has a downwardly dependent nose 35, 36 at one end and a mounting bore 37, 38 at the other. The mounting bores 37, 38 are large enough to allow free passage of the threaded stems of the bolts 19 and 18 whereby, on tightening of the bolts 18, 19, the flat portions of the springs 33, 34 rest against the bottom 15 while the downwardly rounded noses 35, 36 project into the groove 31. The dimension of the noses 35, 36 and the resiliency of the springs 33, 34 are so designed as to provide that the rounded lowermost tips of each nose press both against the top face of the pin 32 (FIG. 9). This results in that the pin 32 is held relatively firmly within the groove 31 and does not inadvertently slide out despite vibrations and impacts to which a cultivator is normally exposed. If it is required to remove the pin 32, it is relatively easy to overcome the friction exerted by the springs 33, 34 without the need for disassembling their securement to the adaptor 10. It will thus be appreciated that the arrangement of the springs 33 and 34 and the groove present one embodiment of what is generally referred to as resilient friction inducement means projecting into said groove 31 and adapted to frictionally press the locking pin 32 inserted in the groove 31 to provide a frictional engagement between the adaptor 10 and the pin 32 in order to impede the movement of the pin relative to the adaptor along the groove 31.

Referring now to FIGS. 2, 8, 9, 10, 12 and 13, a typical earth working tool is shown. In the embodiment shown, this is a sweep of a cultivator. The sweep has two V-shaped wings 45. The wings 45 are integrally forged with a socket 46 of the sweep. The socket 46 extends upwardly and rearwards as is well known in the art, which is a position it normally assumes in operation. Similarly, the part of the shank S supporting the adaptor 10 is inclined (inclination not shown in the drawings).

The inner structure of the socket 46 is compatible with the taper of the adaptor 10. The inside of the socket 46 has a pair of opposed first inner side walls 47, 48 and a pair of upper side walls 49, 50. The walls 49, 50 are compatible with side walls 21, 23 of the adaptor 10 while the walls 47, 48 correspond in shape and in the taper to side walls 22, 24, respectively.

Figure 2:
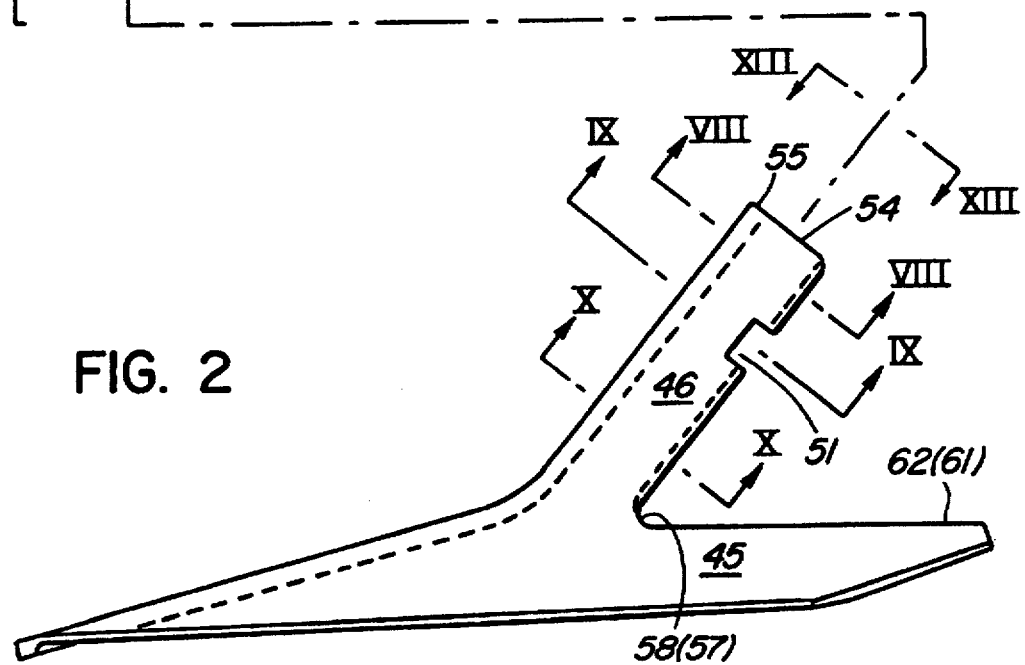
FIG. 2 is a side view of a sweep presenting one embodiment of an earth working tool including the features of the present invention.
Figure 11:
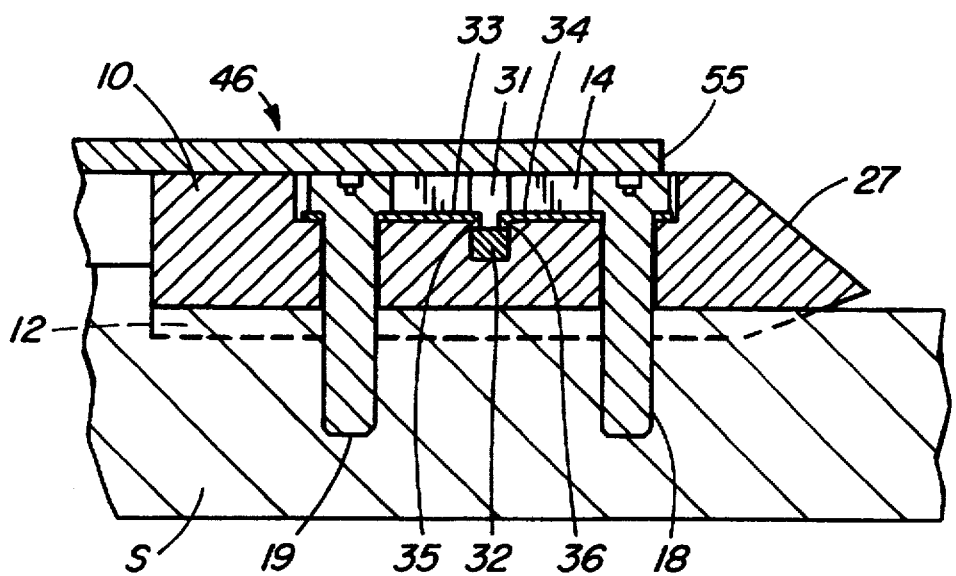
FIG. 11 is section XI—XI of FIG. 9.
Figure 12:
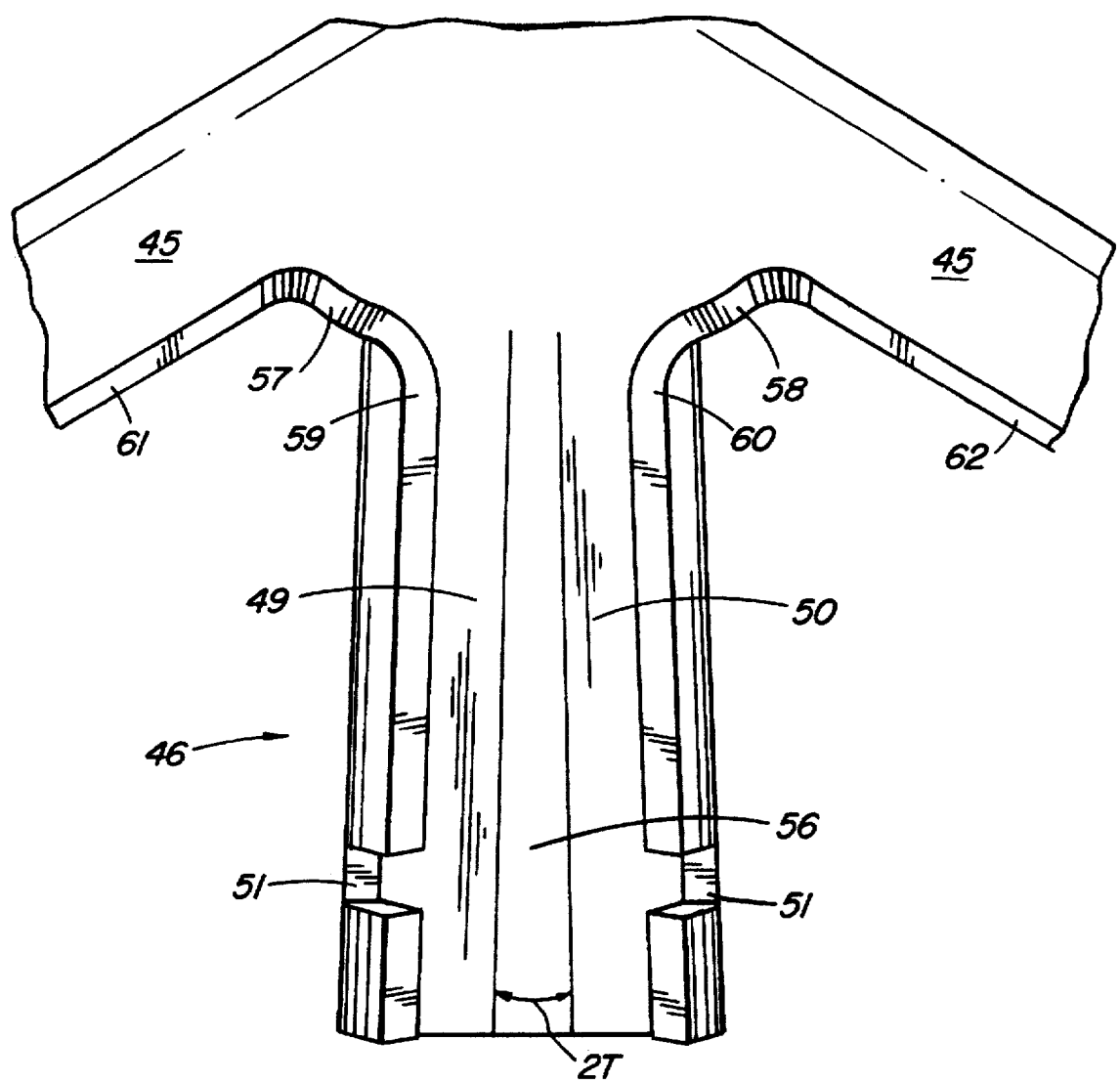
FIG. 12 is a partial bottom view of a cultivator sweep showing the socket including a feature of the present invention, the socket being viewed through the longitudinal opening underneath.

Provided in the side walls 47 and 48 is a transverse recess means 51 (FIGS. 2, 9). This is in effect a pair of transversely aligned rectangular cutouts 52, 53 (FIG. 9). As best seen on comparison of FIGS. 9 and 11, the cutouts 52, 53 are aligned with the transverse groove 31 and with the pin 32 when the sweep is in an operative grip position. The size of the recess means 51 is larger than the square shaped cross-section of the pin 32 to accommodate production tolerances in the taper of the adaptor 10 and socket 46 which may result in a slightly different position of the sweeps of the same size longitudinally of the adaptor 10. The size of the recess portion 51, i.e. of the opposed cutouts 52, 53 (FIG. 9) is designed such that even at extreme positions permitted by the manufacturing tolerances of the tapers, and with the socket 46 in a firm wedging frictional grip with the adaptor 10, the pin 32 does not contact the cutouts 52, 53 and the rear edge portion 54 of the socket 46 is spaced approximately ¼" from the abutment faces 28, 29. If an unexpected obstacle is encountered during the operation of the cultivator, the socket 46 can only move as far as the abutment of its rear edge 54 against abutment faces 28 and 29. With the small included angle of the taper, this is a negligible additional displacement which does not excessively increase the wedging grip still allowing the removal by a hammer blow of the socket 46 from the adaptor 10.

The arcuate upper portion 55 of the socket 46 projects above the plane of the top face 20 of the adaptor 10. With the top face 30 of the blocking member 27 flush with the top face 20, the central upper part of the rear edge 54 thus remains exposed to a blow by hammer when it is desired to remove the tool from the adaptor 10. The pin 32, of course, is inserted only when the socket has been secured to the adaptor. It is removed prior to the knocking the socket 46 off the adaptor 10. The clearance between the pin 32 and the cutouts 52,53 is designed to secure that the pin 32 is free of contact with the cutouts even when the rear edge portion 54 abuts against the faces 28,29.

Figure 13:
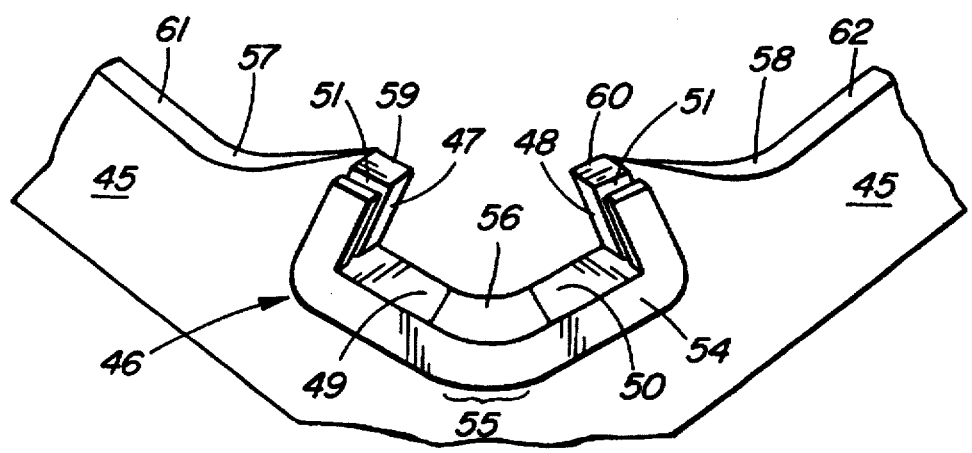
FIG. 13 is an end view XIII—XIII of FIG. 2.

Finally, reference is made again to the taper T which amounts, according to one feature of the invention, to about 1° on each side so that the included angle of the taper is from about 2° to about 3°. Reference number 56 designates the underside of the wall of the socket 46 corresponding to the arcuate portion 55 referred to above. Disposed to both sides of the underside 56 are the generally planar upper side walls 49, 50. The inner side walls 47, 48 are not visible in FIG. 12 but are shown in FIG. 13. Reference numbers 57, 58 (also shown in FIG. 2) designate root portions at which the longitudinal edges 59, 60 of the open underside of the socket 46 merge with rear or trailing edges 61, 62 of the sections of the V-shaped blade portion 45.

The upper side walls 49–50, the inner side walls 48–47 and the opposed longitudinal corners therebetween are compatible with the corresponding surfaces of the adaptor 10. As described above, they taper in the direction toward the blades 45 at a taper of 1° at each side or an included angle of about 2° which is the value 2T as marked in FIG. 12.

In operation, the adaptors 10 are bolted, by bolts 18, 19, to the tines or shanks S of a cultivator. Simultaneously, the corresponding flat springs 33, 34 are secured in operative position with the tongues 35, 36 now in the transverse groove 31. Next, the socket 46 is slid over the adaptor 10 until the taper no longer permits further movement toward the rear end R. Then a solid hammer blow is effected at the tip of the V-shaped blade which places the socket 46 in a firm wedging grip with the adaptor 10. The rear edge 54 is now about ¼" from the face 29 (cf. FIG. 11). The procedure is repeated on as many stems S as is required. Eventually, the pin 32 is inserted in the groove 31. While being inserted, it causes the springs 33, 34 to flex upwards to develop a holding force at the tips of the tongues 35, 36 whereby the lower rounded edges resiliently press the pin 32 against the bottom of the groove 31 and hold it in place.

As the cultivator moves over the field, one or more sweeps may hit a rock, a root or the like obstacle in the ground. The inertia of the movement of the cultivator results in a force driving the socket 46 further toward the rear end R, but only until the rear edge 54 of the socket 46 abuts against the walls 28, 29. Due to the small angle of the taper described, this is not an excessive displacement; it will increase the frictional wedging grip only relatively moderately. When the tool is worn and has to be replaced, a hammer blow at the arcuate upper portion 55 will suffice to release the sweep from the adaptor and thus from the shank, regardless whether an excessive impact had occurred during the operation or not.

When it is desired to replace a worn sweep, the pin 32 is first removed from the groove 31. A forwardly directed hammer blow is then effected at the arcuate upper portion 55 to release the old sweep. A new sweep can now be installed as described.

In the unlikely event that even with the strong wedging force owing to the small wedging angle the grip is inadvertently lost, the socket 46 slides forwards along the adaptor 10 only until the end portions of the pin 32 engage the upper or rear edge of each cutout 52, 53 preventing the sweep from falling down and possibly causing injury or damage.

In summary, the present invention provides an improved wedging grip between the sweep and the adaptor while at the same time securing convenient replacement even if the earth working tool has been exposed to numerous excessive rearwards acting impacts.

Those skilled in the art will readily appreciate that many different embodiments may exist differing from the embodiment described without departing from the scope of the accompanying claims.

For instance, the blocking of the excessive movement of the socket over the adaptor can be secured by a plain bolt suitably dimensioned and passing through the socket, the adaptor and the shank or tine. An attachment of the blocking device to the shank of the cultivator, separate from the adaptor is another possibility. The excessive displacement may also be prevented by an outwardly flared rear end section of the tapering side walls of the adaptor, i.e. by an additional wedging portion having a steeper wedging angle and not employed in generating the grip. Also, the blocking engagement can be arranged at a position of the sweep different from the rear edge 57, 58 of the socket, for instance at the rear edge of the joinder between the wings of the sweep. The groove 31 may be replaced by a bore. It has already been mentioned that the blocking member 27 is preferably integral with the adaptor 10 but it may be a separate unit. The adaptor itself may be either of the type shown or it may be integrally formed as a free end portion of a cultivator tine. The above are but a few examples of modifications which do not depart from the invention even though some of them may substantially differ from the embodiment described.

Accordingly, we wish to protect by Letters Patents which may issue on the present application all such embodiments as fairly fall within the scope of our contribution to the art.

I claim:

1. An assembly for securement of an earth working tool to an elongated member complementary with a socket of the tool to secure the tool to an earth working implement attached to said elongated member by a wedging frictional grip between said elongated member and said socket, said arrangement comprising, in combination:

(a) said elongated member being an elongated tapered adaptor, said elongated tapered adaptor including:
  i) a first end and an opposed second end;
  ii) securement means for fixedly securing the adaptor to said earth working implement;
  iii) opposed surfaces complementary with inner surfaces of the socket of said earth working tool for a wedging frictional grip between the adaptor and the socket upon a forced insertion of the socket over and along the adaptor, in a direction from said first end to said second end of the adaptor; and b) blocking means adapted to block an additional relative movement between the socket and the adaptor excessively beyond a location corresponding to a firm wedging frictional grip between the socket and the adaptor required for operative securement of the tool to the implement, to allow release of the tool from the implement by a hammer blow even if there has been said additional relative movement due to an excessive impact at the tool.

2. The assembly of claim 1, wherein said blocking means is adapted to limit said additional relative movement by engaging a part of the earth working tool with a retainer surface having a fixed position relative to the adaptor.

3. The assembly of claim 1, wherein said blocking means is adapted to limit said additional relative movement by abutment against a part of said tool by an abutment surface having a fixed position relative to said adaptor.

4. The assembly of claim 3, wherein the abutment surface is adapted to abut against a rear edge portion of the socket.

5. The assembly of claim 4, wherein the abutment surface is adapted to abut against said rear edge portion of the socket at opposed side surfaces of the adaptor and near the second end thereof.

6. The assembly of claim 3, wherein said securement means is adapted to secure the adaptor to a shank of said earth working implement, and the blocking means is an integral part of said adaptor.

7. The assembly of claim 6, wherein the blocking means includes an abutment surface generally perpendicular to the elongation of the adaptor.

8. The assembly of claim 6, wherein the blocking means defines two generally co-planar abutment faces generally perpendicular to the elongation of the adaptor and located one at each of said opposed surfaces near said second end of the adaptor.

9. The assembly of claim 6, wherein the adaptor includes a planar top surface extending from said first end to said second end and generally coplanar with an upper surface of said blocking means, whereby, an upwardly arched central part of a rear edge of the socket near said top surface remains exposed for a releasing impact by a hammer.

10. An assembly for securement of an earth working tool to an elongated, tapered member complementary with a socket of the tool to secure the tool to an earth working implement attached to said elongated, tapered member by a wedging frictional grip between said elongated, tapered member and said socket, said arrangement comprising, in combination:

(a) said elongated, tapered member being an elongated tapered adaptor, said elongated tapered adaptor including:
  i) a first end and an opposed second end;
  ii) securement means for fixedly securing the adaptor to said earth working implement;
  iii) opposed side surfaces complementary with inner faces of the socket of said earth working tool for a wedging frictional grip between the adaptor and the socket upon a forced insertion of the socket over and along the adaptor, in a direction from said first end to said second end of the adaptor;

(b) blocking means adapted to block an additional relative movement between the socket and the adaptor excessively beyond a position providing a firm wedging frictional grip between the socket and the adaptor required for operative securement of the tool to the implement, to allow release of the grip by a hammer blow at a rear edge of said socket even if there has been said additional relative movement due to an excessive impact at the tool, (c) said blocking means being adapted to block said relative movement excessively beyond said position providing a firm wedging frictional grip by abutment against a part of said tool by an abutment surface, said surface having a fixed position relative to said adaptor;

(d) said means for fixedly securing the adaptor being arranged to secure the adaptor to a shank of said earth working implement, the blocking means being an integral part of said adaptor;

(e) a transverse passage in said adaptor disposed between said first and second ends and open at both sides of the adaptor;

(f) a transverse recess means in said socket complementary with said transverse passage for alignment therewith when the socket is in said firm wedging frictional grip with the adaptor;

(g) a securement pin disposed for a sliding engagement with said passage and freely movable through said recess means to prevent undesired longitudinal sliding of the socket off the adaptor when the wedging frictional grip is lost;

(h) friction increasing means projecting into said transverse passage and disposed to resiliently press said locking pin agianst said passage to provide a frictional engagement between the adaptor and the pin to resiliently impede undesired movement of the pin out of said passage.

11. The assembly of claim 10, wherein the friction increasing means includes an L-shaped spring secured to the adaptor and comprised of a planar body portion and a short nose portion depending from an end of the body portion and reaching into the passage to resiliently press against said pin.

12. The assembly of claim 11, wherein the body portion of the spring includes a bolt passage hole for securement of the spring to the adaptor by a bolt which simultaneously secures the adaptor to a shank of said earth working implement.

13. The assembly of claim 12 comprising a pair of said springs one to each side of said passage, whereby two of said nose portions reach into the passage.

14. An assembly for securement of an earth working tool to an elongated, tapered member complementary with a socket of the tool to secure the tool to an earth working implement attached to said elongated member by a wedging frictional grip between said elongated member and said socket, said arrangement comprising, in combination:

(a) said elongated member being an elongated tapered adaptor, said elongated tapered adaptor including:
  i) a first end and an opposed second end;
  ii) securement means for fixedly securing the adaptor to said earth working, implement;
  iii) opposed side surfaces complementary with inner surfaces of the socket of an associated earth working tool for a wedging frictional grip between the adaptor and the socket upon a forced insertion of the socket over and along the adaptor, in a direction from said first end to said second end of the adaptor;

(b) a transverse passage in said adaptor disposed between said first and second ends and open at the sides of the adaptor;

(c) transverse recess means in said socket complementary with said transverse passage for alignment therewith when the socket is in said wedging frictional grip with the adaptor;

(d) a securement pin adapted for a sliding engagement with said passage and freely movable through said recess means to prevent undesired longitudinal sliding of the socket off the adaptor when the wedging frictional grip is lost; and (e) friction increasing means projecting into said transverse passage and adapted to resiliently press said locking pin against said passage to provide a frictional engagement between the adaptor and the pin to resiliently impede undesired movement of the pin out of said passage.

15. The assembly of claim 14 wherein the friction increasing means includes an L-shaped spring secured to the adaptor and comprised of a planar body portion and a short nose portion depending from an end of the body portion and reaching into the passage to resiliently press against said pin.

16. The assembly of claim 15 wherein the body portion of the spring includes a bolt passage hole for securement of the spring to the adaptor by a bolt which simultaneously secures the adaptor to a shank of said earth working implement.

17. The assembly of claim 16 comprising a pair of said springs one to each side of said passage, whereby two of said nose portions reach into the passage.

18. An assembly for securement of an earth working tool to an elongated, tapered member complementary with a socket of the tool to secure the tool to an earth working implement attached to said elongated, tapered member by a wedging frictional grip between said elongated, tapered member and said socket, said arrangement comprising, in combination:

(a) said elongated, tapered member being an elongated tapered adaptor, said elongated adaptor tapering at an included angle of about 2 degrees to about 3 degrees in the general direction of operative movement of said implement, said adaptor including:
  i) a first end and an opposed second end;
  ii) securement means for fixedly securing the adaptor to said earth working implement,
  iii) opposed surfaces complementary with inner surfaces of the socket of said earth working tool for a wedging ftictional grip between the adaptor and the socket upon a forced insertion of the socket over and along the adaptor, in a direction from said first end to said second end of the adaptor; and (b) blocking means adapted to block an additional relative movement between the socket and the adaptor excessively beyond a location providing a firm wedging frictional grip between the socket and the adaptor required for operative securement of the tool to the implement while still allowing release of the tool from the implement by a hammer blow at said socket.

* * * * *